Feb. 1, 1927.
J. H. BOURGON
1,615,826
VEHICLE CLOSURE
Filed Jan. 21, 1925
3 Sheets-Sheet 2
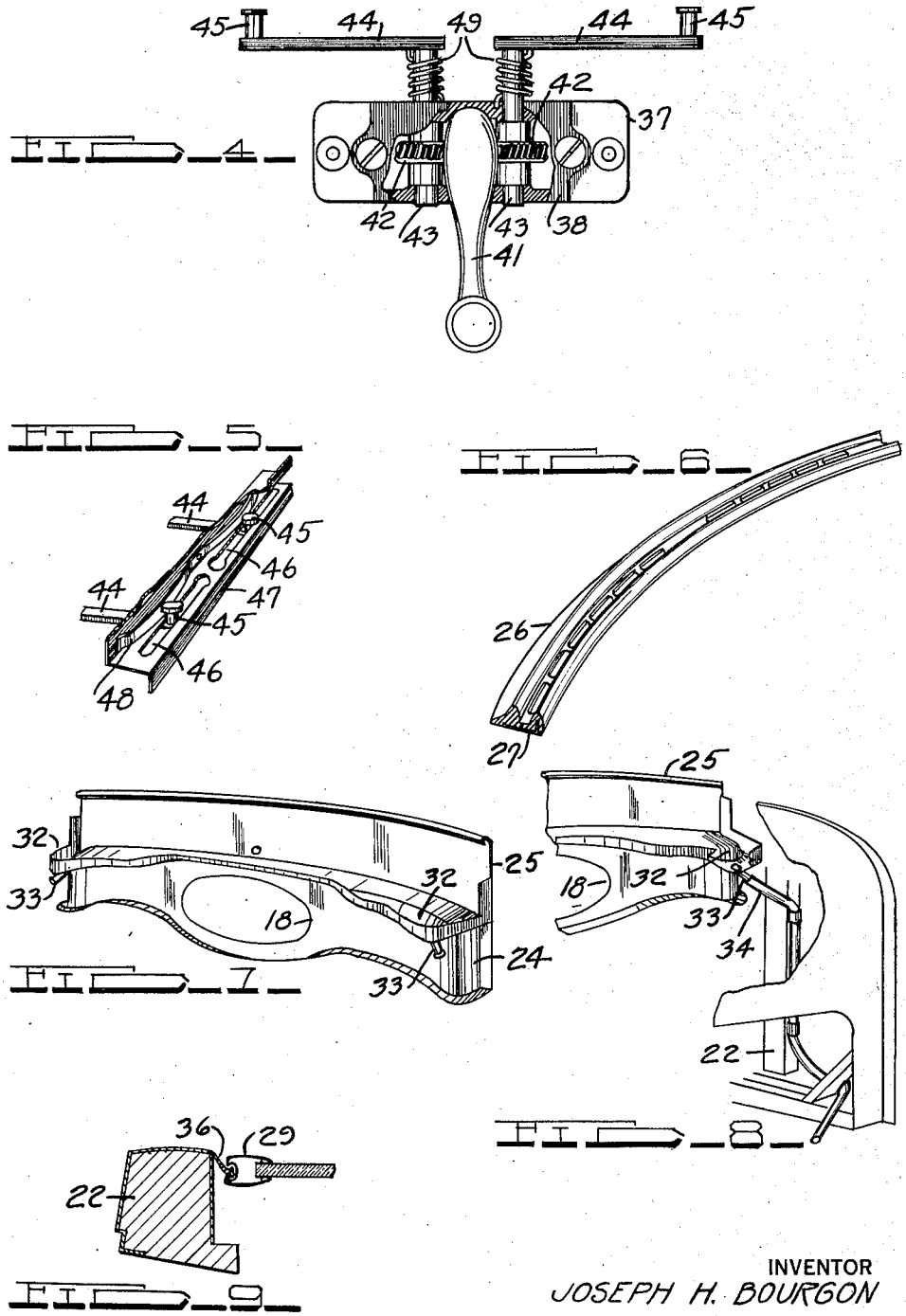
INVENTOR
JOSEPH H. BOURGON
BY
ATTORNEY Feb. 1, 1927.
J. H. BOURGON
1,615,826
VEHICLE CLOSURE
Filed Jan. 21, 1925 3 Sheets-Sheet 3
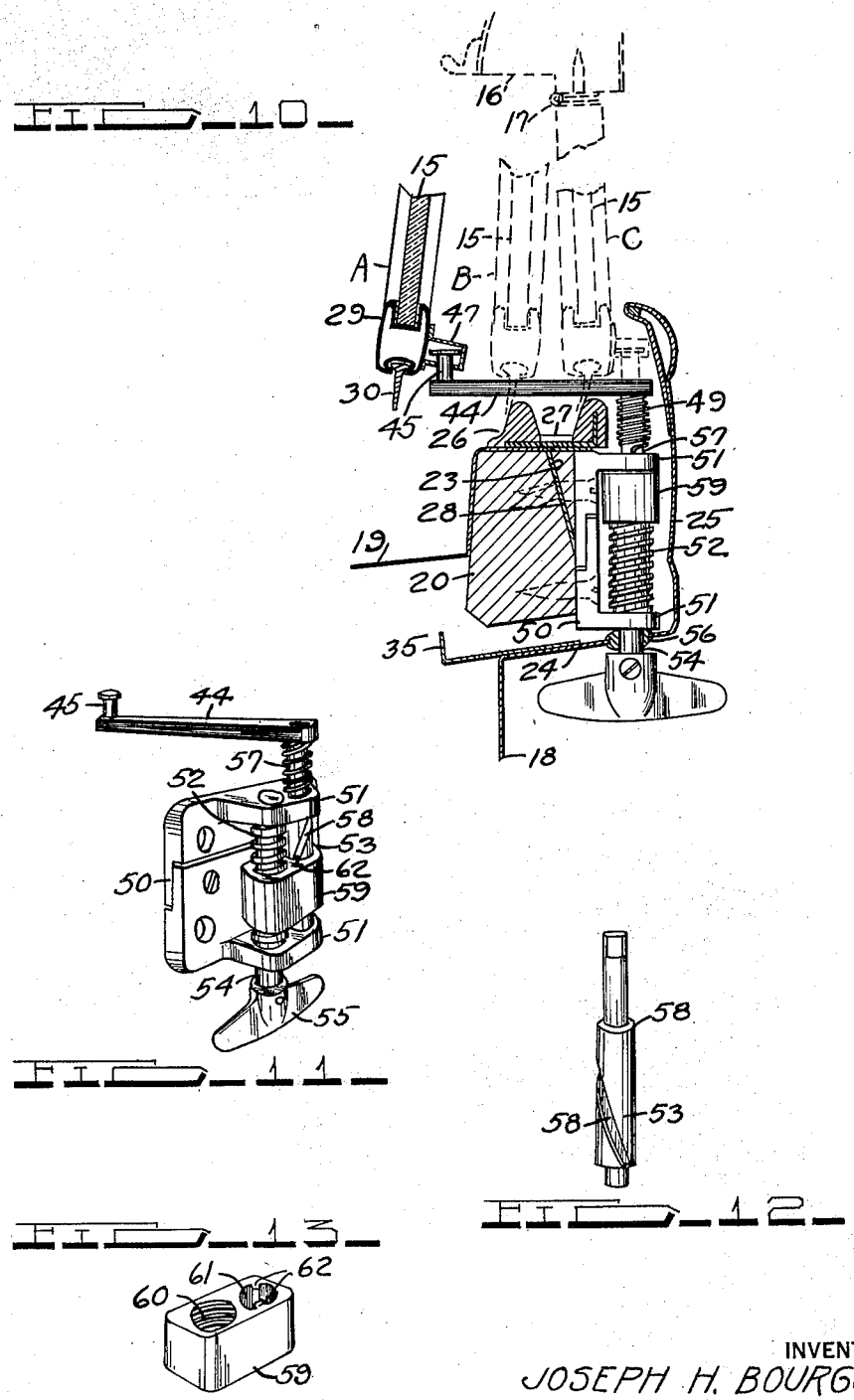
INVENTOR
JOSEPH H. BOURGON
BY
ATTORNEY Patented Feb. 1, 1927.

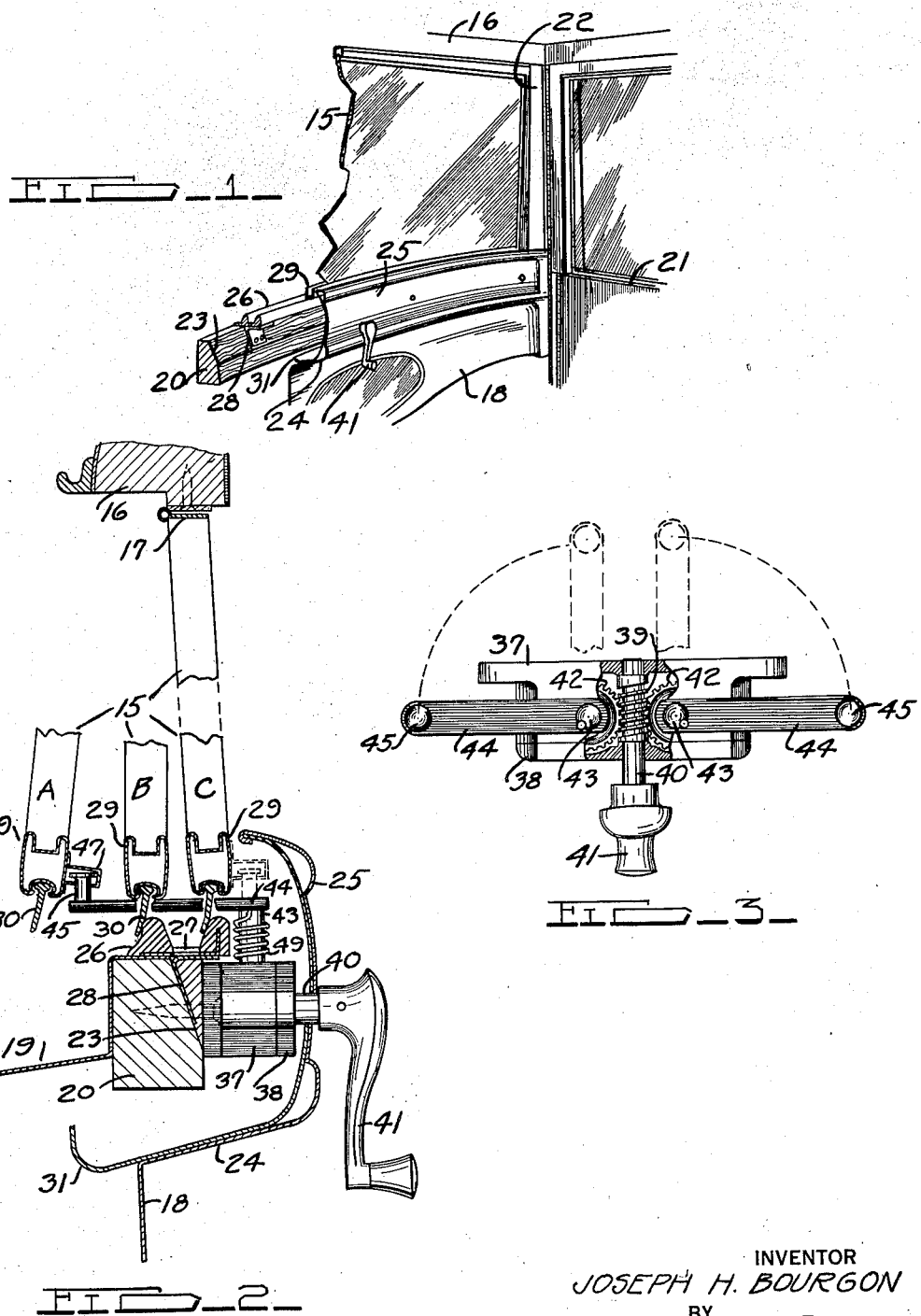

1,615,826

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

VEHICLE CLOSURE.

Application filed January 21, 1925. Serial No. 3,795.

This invention relates to closures for vehicles, and particularly to means for ventilating closed vehicle bodies.

An object of this invention is to provide a novel construction in combination with a vehicle windshield whereby air may be introduced into the vehicle body and to provide mechanical means for causing the windshield to assume various pivotal positions.

Another object is to provide means whereby the windshield of a vehicle may be adjusted to different positions to effect different conditions of ventilation.

Another object is to provide means in combination with a windshield of a vehicle whereby when the windshield is moved to a predetermined position a passage way will be exposed for air to enter the vehicle body forward of the instrument board and below the cowl.

Another object is to provide means in combination with the means such as described above, whereby rain and the like attempting to enter the body of the vehicle with the ventilating air will be collected and drained to a point outside of the vehicle body.

Another object is to provide vehicle ventilating means in combination with a vehicle windshield whereby when the windshield is moved to one pivotal position, air will be introduced into the vehicle body only forward of the instrument board and under the cowl, and when moved to another position, air will not only be introduced as in the first position, but will also be introduced over the top of the instrument board directly into the vehicle body.

Still another object is to provide manually operated mechanical means for causing the windshield to assume either of the positions mentioned above or to assume a position whereby the ventilation mentioned is completely shut off.

A further object is to provide a vehicle instrument panel provided with a reinforcing member also acting as a rain trough for catching and carrying away any rain that may come in contact therewith by reason of the ventilating means described above.

The above being among the objects of the present invention, the same consists of certain features of construction and combination of parts to be herein described with reference to the accompanying drawings, and then claimed, having the above and other objects in view.

In the above accompanying drawings which illustrate a suitable embodiment of the present invention, and in which like numerals refer to like parts throughout the several different views, Figure 1 is a fragmentary perspective view of the interior of a closed type of motor vehicle body in which an embodiment of the present invention is shown.

Figure 2 is a central vertical sectional view taken longitudinally of the vehicle body illustrated in Figure 1, showing the three principal operative or pivotal positions that the windshield may assume.

Figure 3 is a plan view of the means for operating the windshield to assume the different pivotal positions to effect different conditions of ventilation.

Figure 4 is an elevation of the windshield operating means shown in Figure 3, certain parts being broken away to more clearly show the operating gears.

Figure 5 is a fragmentary perspective view of the bracket adapted to be secured to the windshield frame with extremities of the arms of the windshield operating device in operative relationship therewith.

Figure 6 is a perspective view of the windshield abutment and ventilating strip.

Figure 7 is a rear perspective view of the instrument panel, illustrating the manner in which the reinforcing member is formed to provide a trough to collect any rain entering the ventilator.

Figure 8 is a fragmentary rear perspective view of the instrument panel, illustrating the manner in which rain collected in the trough is discharged outside of the vehicle body.

Figure 9 is a horizontal section through a windshield post and part of the adjacent windshield, together with a means providing an air-tight joint between the two members.

Figure 10 is a view corresponding with Figure 2 but in which a modified form of the windshield operating means is shown.

Figure 11 is a perspective view of the windshield operating means shown in Figure 10.

Figure 12 is a perspective view of the operating shaft shown in the preceding two views.

Figure 13 is a perspective view of the nut or block member used in connection with the shaft shown in Figure 12.

The portion of the vehicle body shown in Figures 1 and 2 includes a windshield 15, top front cross member 16 to which the upper edge of the windshield 15 is pivoted by means of a piano hinge 17, instrument panel 18, cowl 19, body cross member 20 situated at the upper rear edge of the cowl 19, door 21 and door post 22. The upper rear face of the cross member 20 is beveled as at 23 and the upper edge of the instrument board 18 is bent rearwardly as at 24 and then upwardly as at 25 above the upper edge of the body cross member 20 to form an ornamental moulding and for other purposes to be hereinafter described, it being spaced from the body cross member 20 at all points.

Secured to the upper face of the body cross member 20 is the abutment member 26 extending the full length of the same and comprising two upstanding spaced parallel ribs connected together by a perforated web. The preferable construction of this abutment member 26, as shown, is of moulded rubber with a metallic reinforcing portion 27. The rear edge of the forward rib is positioned flush with the upper edge of the beveled face 23 of the body cross member 20, the perforated rib portion extending rearwardly therefrom and over the beveled face 23. Braces such as 28 are preferably provided at spaced intervals along the beveled face 23 to provide additional supporting means for the rearwardly overhanging portion of the abutment member 26. The bottom edge of the windshield frame 29 is provided with a flexible blade member 30 which is adapted to contact with either one of the upstanding ribs of the abutment member 26 when the windshield 15 is moved to bring it into the plane thereof.

In Figure 2 is illustrated the three principal operative positions, designated as A, B and C, that the windshield 15 may assume. When the windshield 15 is in position B, and the blade 30 is in contact with the forward upstanding rib of the abutment 26, it will be evident that no air may enter the body of the vehicle, inasmuch as there is a tight joint between the lower face of the forward rib and the body cross member 20, and the blade 30, being in contact with the forward rib, makes a tight joint between the same and the windshield. When the windshield 15 is in position B, then no air may pass under the same and enter the vehicle body. Now, if the windshield is moved back so as to bring the blade 30 out of contact with the forward rib of the abutment 26 and into contact with the rear rib as illustrated in position C, air directed against the windshield 15 is directed downward, and passing through the perforated web between the ribs, is directed downwardly and back of the instrument board 18 underneath the cowl 19 into the body of the vehicle. A certain amount of air will also be directed upwardly back of the forward face of the upper portion 25 of the instrument board 18 and against the rear face of the windshield 15. This is particularly desirable for and effective in, eliminating fog or moisture which often collects on the inside surface of the windshield from a person's breath, or from other reasons, and which obscures the vision of the road ahead. This, in the form shown in the drawing, in which the web of the abutment is relatively narrow, allows a moderate amount of ventilation of the vehicle body.

If a greater amount of ventilation is desired, the windshield 15 is moved to position A, in which position not only may the air enter the vehicle body through the perforations in the web of the abutment member 26, but an additional amount of air may be collected by the upper forwardly projecting edges of the instrument board upper portion 25 and directed underneath the cowl 9, while a still greater amount of air may pass directly over the top of the instrument board directly into the vehicle body. Variations of the position of the windshield 15 other than the three principal positions shown will, of course, modify the passage of air into the vehicle body as described above.

To utilize the ventilation by moving the windshield 15 to position C in rainy or stormy weather without introducing any rain into the interior of the vehicle body, with the air, a trough is formed in the path of the incoming air which deflects the air sufficiently to cause the rain to be eliminated and to be deposited in the trough, from which it is drained to a point outside the vehicle. I prefer to make this trough integral with the instrument board and in doing so I prefer to so form the trough to provide a reinforcement for the same. The instrument board shown in Figures 1, 2, 7 and 8 illustrates one method of forming the trough therewith, and the instrument board shown in Figure 10 illustrates another method. In the first method a reinforcing trough member 31, conforming in shape substantially to the rearwardly extending portion 24 and the upwardly extending portion 25 of the instrument board 18, is secured to the forward face thereof by spot welding or the like, and the upper edge of the portion 25 is bent over and back on the upper edge of the member 31 thereby to better secure the same and to present a more finished appearance The lower edge is extended slightly forward of the main portion of the instrument board and its forward edge is turned upwardly, thereby completing that side of the trough. This trough conforms to the transverse curve of the cross member 20 and any rain collected therein is thereby led to the ends of the same which are widened and deepened to form a collecting pocket 32 provided with a spout 33 which receives a tube or pipe 34 extending therefrom to a point below the floor of the vehicle, as shown in Figure 8, whereby any rain collected in the pocket 32 is discharged to a point beneath the vehicle body.

In the construction shown in Figure 10 the upper edge of the upper portion 25 of the instrument board 18 is bent forwardly and back on itself to form a reinforcement, and an angle piece 35 is secured to the rearwardly extending portion 24 to form a trough collecting pocket in substantially the same manner and with the same results as in the first method described.

To prevent rain laden air from entering the vehicle body when the windshield 15 is in either poistion B or C, the inside face of the door posts 22 are provided with a relatively wide flat face against which a flexible blade 36 carried by the side of the windshield frame 29, contacts to make a closed joint as shown in Figure 9.

It will be evident from the above that the constructions just described will eliminate and drain to a point outside of the vehicle body any rain that may enter the ventilating openings when the windshield is in position C. thereby allowing ventilation of the vehicle body in rainy weather without any discomfort to the occupants as a result thereof.

In order that the windshield 15 may be readily moved to the various positions above referred to, I have provided means to accomplish the same, and although but two embodiments of such means are shown and described in the accompanying drawings, it will be understood that any suitable means may be provided for moving the windshield to the various ventilating positions without departing from the spirit or scope of that particular feature of the present invention.

The first embodiment of the windshield operating means, as shown in Figures 1 to 5 inclusive, includes a bracket 37 secured to the rear face of the body cross member 20. The bracket 37 is provided with a face plate 38 and houses a worm 39 formed on the horizontally disposed shaft 40 whose axis lies longitudinally of the vehicle, and which is provided with a bearing in the bracket 37 and face plate 38. The shaft 40 is provided on its rearwardly extending end, which projects back through the upper portion 25 of the instrument board 18, with a handle 41 which is non-rotatably secured thereto so that the worm 39 may be turned thereby. Two worm gears 42 are also housed within the bracket 37 in meshing relation with the worm 39 on the vertically disposed shafts 43 which have bearings in the bracket 37. The shafts 43, which are non-rotatably secured to the worm gears 42, project up through the bracket 37 and each is provided with a horizontally disposed, relatively non-rotatable arm 44 at its upper end. These arms 44 are adapted to simultaneously move, upon turning of the handle 41, from the position shown by full lines in Figure 3 to the position shown by dotted lines in the same figure, their free ends describing the arc of a circle as indicated. The free ends of the arms 44 are each provided with an upstanding headed pin 45 which is adapted to slidably operate in its corresponding slot 46 (see Figure 5) formed in the under surface of the U-shaped bracket 47 secured to the rear face of the windshield frame 29. The relation of the bracket 47 to the arms 44 is such that when the handle 41 is turned to bring the arms to the position shown by full lines in Figure 3, the bracket 47 together with the windshield 15 is moved to the position indicated as position C in Figures 2 and 10, and when the handle 41 is turned to move the arms 44 to the position indicated by dotted lines in Figure 3, the bracket 47 and windshield 15 is caused to move to the full ventilating position indicated as position A in Figures 2 and 10, and turning of the handle 41 to bring the arms to any position intermediate the two positions referred to in Figure 3 will cause a corresponding relative change in the position of the windshield 15, such as position B as indicated in Figures 2 and 10, as will readily be understood. Flat bow springs 48 (see Figure 5) secured within the bracket 47 are adapted to bear against the pins 45. thereby pressing them against one edge of the slot 46 to prevent rattling. A coil spring 49 surrounding each of the shafts 43 under tension and with one end anchored in its corresponding arm 44 and the other end anchored in the bracket 37, serves to assist turning of the handle 41 in one direction, and to exert a pressure between the teeth of the worm gears 42 and the worm 39, thereby taking up any slack between those parts and preventing rattling of the same.

The second embodiment or variation of the windshield operating means, as shown in Figures 10 to 13 inclusive, includes a two-part bracket 50 having two horizontally extending ears or flanges 51 extending rearwardly therefrom at its upper and lower edges. Journaled in and between the ears 51 in a vertical position is a screw member 52 and an arm operating shaft 53. The screw member 52 is provided with an elongated end 54 which projects through the lower ear 51 and down through the rearwardly extending part 24 of the instrument panel 18, and a wing member 55 is non-rotatably secured thereto to provide means for turning the screw member 52. A rubber packing member 56 is provided at the point where the elongated end 54 passes through the portion 24 to prevent rain collected in the rain trough from passing therethrough.

Spaced from the screw member 52 and parallel thereto is the arm operating shaft 53, provided with an upwardly extending elongated portion 57 which projects through the upper ear 51 and non-rotatably receives the arm 44 provided with the headed pin 45, in the same maner as either one of the shafts 43 of the first explained modification, and which engages and operates the windshield 15 in like manner. The arm operating shaft 53 is provided with two steep spiral grooves 58 in its outer surface. Connecting the screw member 52 and arm operating shaft 53 is a block member 59 which is provided with a threaded opening 60 (see Figure 13) for engagement with the screw member 52 and an opening 61 for engagement with the arm operating member 53. Radially inwardly projecting keys 62 are provided in the opening 61 and enter and engage the groove 58 in the arm operating member 53. It is evident that when the wing member 55 is turned, thus turning the screw member 52, the block member 59 is caused to raise or lower according to the direction of rotation that the wing member 55 is turned. When the block member 59 is thus raised or lowered, the keys 62 which are non-rotatable, cause the grooves 58 to follow them, thus causing the arm operating member to turn accordingly, and which turning likewise causes the arm 44 to turn. It is thus evident that turning of the wing member 55 effects a turning of the arm 44 which effects a variation in the position of the windshield 15 as previously described. Variations in the pitch and diameter of the threads on the screw member 52 and the grooves 58 in the arm operating member 53 will effect a change in the speed of operation and operating effort of the device as will readily be understood.

From the above description it will be seen that the windshield 15 can be positioned to exclude air from the vehicle body, or the same can be moved so that the blade 30 mounted on the windshield frame 29 will contact with the rear abutment of the member 26 whereby a limited amount of air can be admitted to the vehicle body, or the windshield 15 can be moved on its pivot to a forward position whereby a greater amount of air can be admitted to the vehicle body. The operation of the windshield is preferably effected by mechanical or other means, such as hydraulic or electrical means, which is positioned within the vehicle body within easy reach of the operator. While two embodiments of the invention are shown in the drawings and described in the specification, it is understood that other means may be provided to obtain the result defined by applicant and that such other means are within the scope of the present invention as defined in the appended claims. Also, detailed changes may be made in the various members shown and described without departing from the spirit and scope of this invention as defined in the appended claims.

Having thus described my invention, what I claim and desire to secure by the Letters Patent is:

1. In combination with a vehicle body having a windshield pivoted thereto, abutment means for the lower edge of said windshield comprising two parallel spaced ridge members connected by a perforated web, means whereby air is precluded from entering said vehicle body when said windshield is in contact with one of said ridge members, and means for permitting air to pass through said perforated web and below said cowl when said windshield is in contact with the other of said ridge members.

2. In combination with a vehicle body having a pivoted windshield and a cowl, a member secured to said body having an abutment thereon for precluding the passage of air into said body when said windshield is in one of its pivotal positions, passageways in said member uncovered by said windshield when in another of its pivotal positions for the introduction of air into said body, and deflecting means in the path of said air entering said body for directing the air against the inner face of said windshield.

3. In combination with a vehicle body having a windshield, a ventilating openings in said body adjacent the lower edge of said windshield, an instrument board in the path of the air entering said openings having a portion deflecting said air against the rear face of said windshield, and a trough formed thereon for collecting rain carried by said air entering said openings.

4. In combination with a vehicle body having a windshield and an instrument board, openings in said body adjacent the lower edge of said windshield for directing air into said body against said instrument board, and means secured to said instrument board for reinforcing the same, said reinforcing means intercepting and collecting rain entering said body with said air.

5. In combination with a vehicle body having a cowl, a windshield and an instrument board, openings in said cowl adjacent the lower edge of said windshield connecting the interior of said body with the exterior thereof, said instrument board being positioned in the path of air entering said openings, a gutter formed on said instrument board for collecting rain entering said openings with said air and leading said rain to pockets formed adjacent the ends of said instrument board, and means for leading rain collected in said pockets to a point below said body.

6. In a vehicle body, an automobile instrument board provided with a reinforcing member comprising a trough to collect rain entering said body.

7. An automobile instrument panel provided at its upper end with a rearwardly and then upwardly extending portion, and reinforcing means formed to provide a trough secured to said rearwardly extending portion thereof.

8. In combination with a vehicle body provided with a pivoted windshield and an instrument board, abutment means for the lower edge of said windshield comprising two spaced parallel contact members supported by said cowl forwardly of said instrument board, passageways leading from between said contact members to beneath said cowl, means for bringing the lower edge of said windshield into contact with the forward of said contact members whereby air is precluded from entering said body past said windshield, means for bringing said windshield into contact with the rearward of said contact members whereby air may enter said body through said passageways, and means for positioning the lower edge of said windshield forward of the said forward contact members whereby air may enter said body through said passageways and also directly into said body above said passageways.

9. In combination with an automobile body, a pivoted windshield, a cowl and air deflecting means, an abutment member secured to said body having communicating passages therein between the interior of said body and the exterior thereof, means whereby when said windshield is in one of its pivotal positions said passages are cut off from the exterior of said body, means whereby when said windshield is in another of its pivotal positions air can pass into said body through said openings and against said air deflecting means whereby it is directed beneath said cowl and also against the inner surface of said windshield, and means whereby when said windshield is in said another of its pivotal positions air will be directed under said cowl by said deflecting means and will also enter said body independent of said deflecting means.

10. In combination with a movable windshield, a plurality of oscillatable arms pivoted to a fixed support, means for operatively connecting the free ends of said arms to said windshield, and rotatable means for causing oscillation of said arms in opposite directions.

11. In combination with a windshield pivoted to be positioned in a plurality of ventilating positions, a pair of pivoted arms mounted on a fixed support, means for connecting the free ends of said arms and said windshield, a worm gear, and a worm for causing pivotal movement of said arms in opposite directions to bring said windshield into its different ventilating positions.

12. In combination with a pivoted windshield and a fixed support, a bracket mounted on said support, parallel shafts journaled in said bracket, an arm and a worm wheel non-rotatably secured to each of said shafts, a third shaft journaled in said bracket, a worm non-rotatably secured to said third shaft in meshing relation with said worm wheels, and means for causing rotation of said third shaft to thereby move said windshield.

13. In combination with an automobile body having a windshield pivoted thereto adjacent its upper edge, a cowl and an instrument board, a housing mounted on said cowl adjacent the lower edge of said windshield and forwardly of said instrument board, two parallel spaced shafts journaled in said housing, an arm and a worm gear non-rotatably secured to each of said shafts, the free ends of said arms having sliding engagement with said windshield, a third shaft journaled in said housing substantially perpendicular to the plane of the first mentioned shafts and extending therebetween, a worm on said third shaft meshing with both of said worm gears, said third shaft extending rearwardly through said instrument board and being provided with manually operable shaft turning means on the rearwardly extending end thereof whereby movement of the same causes equal and simultaneous movement of said arms.

Signed by me at Detroit, Michigan, U. S. A., this 16th day of January, 1925.

JOSEPH H. BOURGON.